US012651515B2

(12) United States Patent
Lukan

(10) Patent No.: US 12,651,515 B2
(45) Date of Patent: Jun. 9, 2026

(54) FEEDBACK PROVISION SYSTEM COMPRISING AN AEROSOL PROVISION SYSTEM AND AN AUDIO OUTPUT DEVICE

(71) Applicant: NICOVENTURES TRADING LIMITED, London (GB)

(72) Inventor: Sean Lukan, London (GB)

(73) Assignee: Nicoventures Trading Limited, London (GB)

( * ) Notice: Subject to any disclaimer, the term of this patent is extended or adjusted under 35 U.S.C. 154(b) by 0 days.

(21) Appl. No.: 18/707,252

(22) PCT Filed: Sep. 13, 2022

(86) PCT No.: PCT/GB2022/052308
§ 371 (c)(1),
(2) Date: May 3, 2024

(87) PCT Pub. No.: WO2023/079256
PCT Pub. Date: May 11, 2023

(65) Prior Publication Data

US 2024/0420551 A1 Dec. 19, 2024

Related U.S. Application Data

(63) Continuation of application No. 17/453,688, filed on Nov. 5, 2021, now abandoned.

(51) Int. Cl.
*G08B 3/10* (2006.01)
*A24F 40/60* (2020.01)
*A24F 40/65* (2020.01)

(52) U.S. Cl.
CPC ................ *G08B 3/10* (2013.01); *A24F 40/60* (2020.01); *A24F 40/65* (2020.01)

(58) Field of Classification Search
CPC . G08B 3/10; A24F 40/65; A24F 40/60; A24F 40/53; A61M 11/042; A61M 15/06;
(Continued)

(56) References Cited

U.S. PATENT DOCUMENTS

2011/0265806 A1* 11/2011 Alarcon ................ A24F 40/485 131/273
2015/0128966 A1 5/2015 Lord
(Continued)

FOREIGN PATENT DOCUMENTS

CN 113382397 A 9/2021
EP 3838026 A1 6/2021
(Continued)

OTHER PUBLICATIONS

International Search Report and Written Opinion for corresponding International Application No. PCT/GB2022/052308 mailed Mar. 29, 2023, all pages cited in its entirety.
(Continued)

*Primary Examiner* — Sisay Yacob
(74) *Attorney, Agent, or Firm* — Burr & Forman

(57) ABSTRACT

An aerosol provision system (1) for generating an aerosol, wherein the aerosol provision system (1) is configured to wirelessly transmit a feedback signal (290) to an audio output device (200). The feedback signal (290) is configured for controlling the audio output device (200), which may be a loudspeaker, headphone, or earphone. In some cases, the feedback signal (290) is configured to be wirelessly transmitted by the aerosol provision system (1) in response to a predetermined event being determined as being satisfied by the aerosol provision system (290). In this way, the feedback signal (290) can used as a means to ultimately provide the user, via the audio output device (200), an indication of a current status of the aerosol provision system (1).

18 Claims, 8 Drawing Sheets

(58) Field of Classification Search
CPC .......... A61M 2205/43; A61M 2205/44; G16H 40/60; H04W 4/80; H04R 1/028
See application file for complete search history.

(56) References Cited

U.S. PATENT DOCUMENTS

| | | | |
|---|---|---|---|
| 2016/0173999 | A1 | 6/2016 | Ungstrup et al. |
| 2017/0093981 | A1 | 3/2017 | Cameron |
| 2018/0110262 | A1* | 4/2018 | Batista ................ H04L 12/2803 |
| 2021/0329429 | A1 | 10/2021 | Kim et al. |

FOREIGN PATENT DOCUMENTS

| | | | |
|---|---|---|---|
| JP | 2003204491 | A | 7/2003 |
| JP | 2007108769 | A | 4/2007 |
| JP | 2011087254 | A | 4/2011 |
| KR | 102015136987 | A | 12/2015 |
| KR | 20200013426 | A | 2/2020 |
| WO | 2016156609 | A1 | 10/2016 |
| WO | 2019121778 | A1 | 6/2019 |
| WO | 2020234059 | A1 | 11/2020 |
| WO | 2020235062 | A1 | 11/2020 |
| WO | 2021071208 | A1 | 4/2021 |
| WO | 2021074608 | A1 | 4/2021 |
| WO | 2021220410 | A1 | 11/2021 |

OTHER PUBLICATIONS

Notice of Reasons for Refusal from corresponding Japanese Application No. 2024-525626, mailed Jun. 24, 2025, all pages cited in its entirety.
Notice of Reasons for Rejection from corresponding Japanese Application No. 2024-525626, mailed Oct. 7, 2025, all pages cited in its entirety.
Final Rejection from corresponding Japanese Application No. 2024-525626, mailed Mar. 24, 2026, all pages cited in its entirety.
Notice to File a Response from corresponding Korean Application No. 10-2024-7014983, mailed Apr. 30, 2026, all pages cited in its entirety.

* cited by examiner

FEEDBACK PROVISION SYSTEM COMPRISING AN AEROSOL PROVISION SYSTEM AND AN AUDIO OUTPUT DEVICE

FIELD

The present disclosure relates to aerosol provision systems such as, but not limited to, nicotine delivery systems (e.g. electronic cigarettes and the like).

BACKGROUND

Electronic aerosol provision systems often employ an electronic cigarette (e-cigarette) or more generally an aerosol provision device. Such an aerosol provision system typically contains aerosolisable material (also called aerosol-generating material), such as a reservoir of fluid or liquid containing a formulation, typically but not necessarily including nicotine, or a solid material such as a tobacco-based product, from which a vapour/aerosol is generated for inhalation by a user, for example through heat vaporisation. Thus, an aerosol provision system will typically comprise a vaporiser (also called an aerosol generator), e.g. a heating element, arranged to aerosolise a portion of aerosolisable material to generate a vapour.

Once a vapour has been generated, the vapour may be passed through flavouring material to add flavour to the vapour (if the aerosolisable material was not itself flavoured), after which the (flavoured) vapour may be then delivered to a user via a mouthpiece from the aerosol provision system. A potential drawback of existing aerosol provision systems and associated aerosol provision devices is that, and particularly for those with a visual impairment, and/or in conditions where visibility is reduced, it may not always be readily discernible as to whether the aerosol provision system is working correctly through visual means. It may not also be readily discernible in these conditions for the user to determine a current status of the aerosol provision system through visual means.

Various approaches are therefore described herein which seek to help address or mitigate some of these issues, through the implementation of an aerosol provision system which can be used alongside an audio output device (such as a loudspeaker, headphones, and/or a hearing aid), and in a way such that the aerosol provision system can selectively control the audio output device for providing acoustic feedback to a user of the aerosol provision system, via the audio output device, wherein the acoustic feedback relates to a predetermined condition/operation/status of the aerosol provision system.

The above disclosures thus also provide for mechanisms for those with a hearing impairment to more easily understand a current status of an aerosol provision system, through there being provided an aerosol provision system which can communicate with, and control the operation of, a hearing aid of a user of the aerosol provision system.

SUMMARY

According to a first aspect of certain embodiments there is provided a feedback provision system comprising:

an aerosol provision system for generating an aerosol; and an audio output device for outputting acoustic feedback to a user of the aerosol provision system;

wherein the audio output device is configured to output the acoustic feedback in response to receiving a feedback signal which is initially wirelessly transmitted by the aerosol provision system, wherein the feedback signal is configured for controlling the audio output device.

According to a second aspect of certain embodiments there is provided an aerosol provision system for generating an aerosol, wherein the aerosol provision system is configured to wirelessly transmit a feedback signal to an audio output device;

wherein the feedback signal is configured for controlling the audio output device.

According to a third aspect of certain embodiments there is provided a method of delivering acoustic feedback in a feedback provision system, the method comprising:

wirelessly transmitting a feedback signal, from an aerosol provision system for generating an aerosol, wherein the feedback signal is configured for controlling an audio output device;

receiving the feedback signal at the audio output device for outputting acoustic feedback to a user of the aerosol provision system; and outputting the acoustic feedback from the audio output device.

According to a fourth aspect of certain embodiments there is provided a method of delivering acoustic feedback to an audio output device of a user of an aerosol provision system, using a feedback signal transmitted from the aerosol provision system to the audio output device, wherein the feedback signal is configured for controlling the audio output device.

According to a fifth aspect of certain embodiments there is provided a method of retrofitting an aerosol provision system to deliver acoustic feedback as part of a feedback provision system comprising the aerosol provision system and an audio output device, the method comprising:

providing the aerosol provision system with instructions which, when executed by a controller of the aerosol provision system, cause the controller to:

generate a feedback signal which is configured to be wirelessly transmitted to an audio output device, wherein the feedback signal is configured for controlling the audio output device; and wirelessly transmitting the feedback signal from the aerosol provision system for allowing the feedback signal to be received by the audio output device.

According to a sixth aspect of certain embodiments there is provided an aerosol provision system for generating an aerosol, wherein the aerosol provision system is configured to be connected with an audio output device for outputting acoustic feedback to a user of the aerosol provision system;

wherein the aerosol provision system is configured to output a notification for confirming when the aerosol provision system is connected with the audio output device.

According to a seventh aspect of certain embodiments there is provided an aerosol provision device for use in an aerosol provision system comprising the aerosol provision device and a consumable for releasably engaging with the aerosol provision device;

wherein the aerosol provision device is configured to be connected with an audio output device for outputting acoustic feedback to a user of the aerosol provision device;

wherein the aerosol provision device is configured to output a notification for confirming when the aerosol provision device is connected with the audio output device.

According to an eighth aspect of certain embodiments there is provided a mobile phone configured to be connected with:

an aerosol provision system for generating an aerosol; and an audio output device, configured to be connected with the aerosol provision system, and configured for outputting acoustic feedback to a user of the aerosol provision system;

wherein the mobile phone is configured to output a notification for confirming when the aerosol provision system is connected with the audio output device.

According to a ninth aspect of certain embodiments there is provided a mobile phone configured to be connected with:

an aerosol provision device for use in an aerosol provision system comprising the aerosol provision device and a consumable for releasably engaging with the aerosol provision device; and an audio output device, configured to be connected with the aerosol provision device, and configured for outputting acoustic feedback to a user of the aerosol provision device;

wherein the mobile phone is configured to output a notification for confirming when the aerosol provision device is connected with the audio output device.

It will be appreciated that features and aspects of the invention described above in relation to the various aspects of the invention are equally applicable to, and may be combined with, embodiments of the invention according to other aspects of the invention as appropriate, and not just in the specific combinations described herein.

BRIEF DESCRIPTION OF THE DRAWINGS

Embodiments of the invention will now be described, by way of example only, with reference to the accompanying drawings, in which.

DETAILED DESCRIPTION

Figure 1:
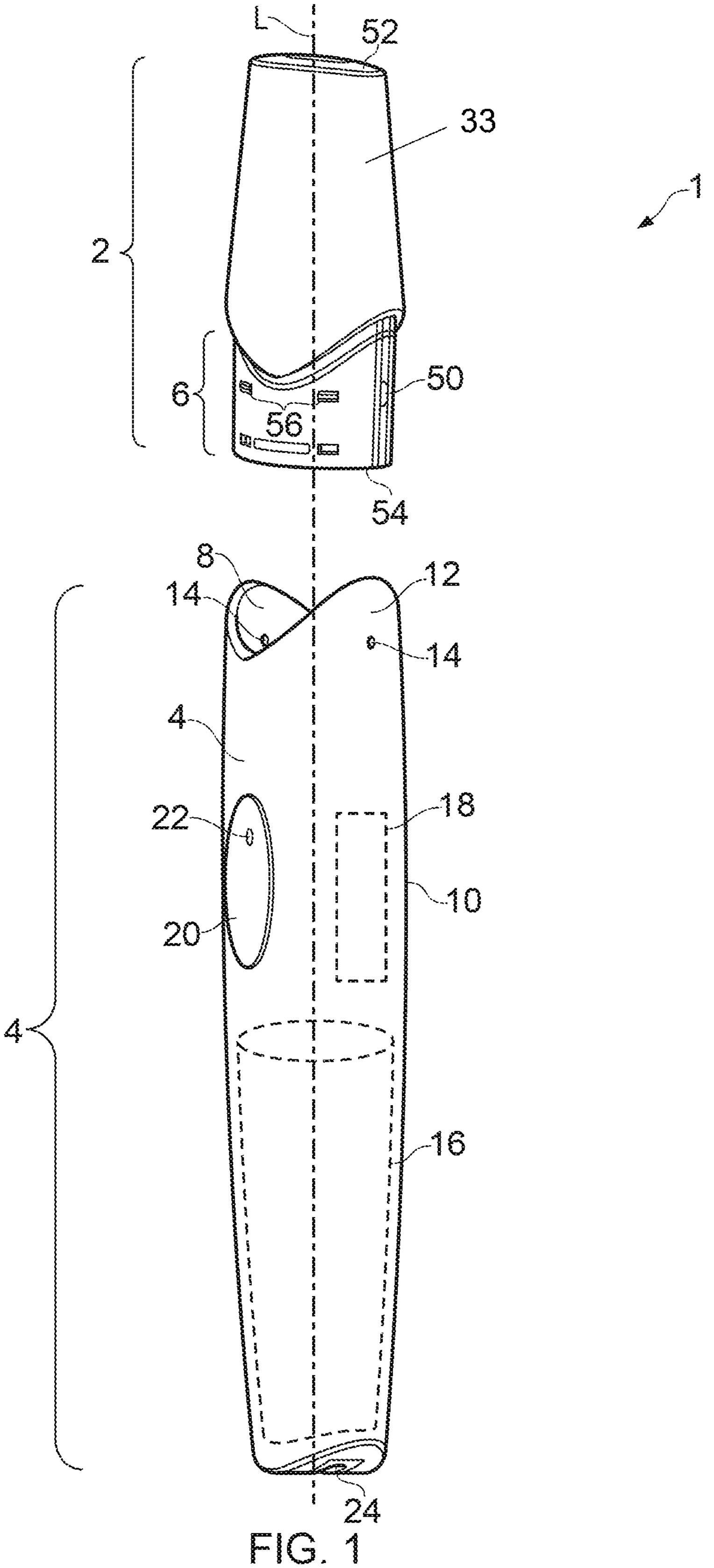
FIG. 1 schematically represents in perspective view an aerosol provision system comprising a cartridge and aerosol provision device (shown separated) in accordance with certain embodiments of the disclosure.

Aspects and features of certain examples and embodiments are discussed/described herein. Some aspects and features of certain examples and embodiments may be implemented conventionally and these are not discussed/described in detail in the interests of brevity. It will thus be appreciated that aspects and features of apparatus and methods discussed herein which are not described in detail may be implemented in accordance with any conventional techniques for implementing such aspects and features.

The present disclosure relates to non-combustible aerosol provision systems (such as an e-cigarette). According to the present disclosure, a "non-combustible" aerosol provision system is one where a constituent aerosolisable material of the aerosol provision system (or component thereof) is not combusted or burned in order to facilitate delivery to a user. Aerosolisable material, which also may be referred to herein as aerosol generating material or aerosol precursor material, is material that is capable of generating aerosol, for example when heated, irradiated or energized in any other way. The aerosolisable material may also be flavoured, in some embodiments.

Throughout the following description the term "e-cigarette" or "electronic cigarette" may sometimes be used, but it will be appreciated this term may be used interchangeably with an aerosol provision system. An electronic cigarette may also known as a vaping device or electronic nicotine delivery system (END), although it is noted that the presence of nicotine in the aerosolisable material is not a requirement.

In some embodiments, the aerosol provision system is a hybrid device configured to generate aerosol using a combination of aerosolisable materials, one or a plurality of which may be heated. In some embodiments, the hybrid device comprises a liquid or gel aerosolisable material and a solid aerosolisable material. The solid aerosolisable material may comprise, for example, tobacco or a non-tobacco product.

Typically, the (non-combustible) aerosol provision system may comprise a cartridge/consumable part and a body/reusable/aerosol provision device part, which is configured to releasably engage with the cartridge/consumable part.

The aerosol provision system may be provided with a means for powering a vaporiser therein, and there may be provided an aerosolisable material transport element for receiving the aerosolisable material that is to be vaporised. The aerosol provision system may also be provided with a reservoir for containing aerosolisable material, and in some embodiments a further reservoir for containing flavouring material for flavouring a generated vapour from the aerosol provision system.

In some embodiments, the vaporiser may be a heater/heating element capable of interacting with the aerosolisable material so as to release one or more volatiles from the aerosolisable material to form a vapour/aerosol. In some embodiments, the vaporiser is capable of generating an aerosol from the aerosolisable material without heating. For example, the vaporiser may be capable of generating a vapour/aerosol from the aerosolisable material without applying heat thereto, for example via one or more of vibrational, mechanical, pressurisation or electrostatic means.

In some embodiments, the substance to be delivered may be an aerosolisable material which may comprise an active constituent, a carrier constituent and optionally one or more other functional constituents.

The active constituent may comprise one or more physiologically and/or olfactory active constituents which are included in the aerosolisable material in order to achieve a physiological and/or olfactory response in the user. The active constituent may for example be selected from nutraceuticals, nootropics, and psychoactives. The active constituent may be naturally occurring or synthetically obtained. The active constituent may comprise for example nicotine, caffeine, taurine, theine, a vitamin such as B6 or B12 or C, melatonin, a cannabinoid, or a constituent, derivative, or combinations thereof. The active constituent may comprise a constituent, derivative or extract of tobacco or of another botanical. In some embodiments, the active constituent is a physiologically active constituent and may be selected from nicotine, nicotine salts (e.g. nicotine ditartrate/nicotine bitartrate), nicotine-free tobacco substitutes, other alkaloids such as caffeine, or mixtures thereof.

In some embodiments, the active constituent is an olfactory active constituent and may be selected from a "flavour" and/or "flavourant" which, where local regulations permit, may be used to create a desired taste, aroma or other somatosensorial sensation in a product for adult consumers. In some instances such constituents may be referred to as flavours, flavourants, flavouring material, cooling agents, heating agents, and/or sweetening agents. They may include naturally occurring flavour materials, botanicals, extracts of botanicals, synthetically obtained materials, or combinations thereof (e.g., tobacco, cannabis, licorice (liquorice), hydrangea, eugenol, Japanese white bark magnolia leaf, chamomile, fenugreek, clove, maple, matcha, menthol, Japanese mint, aniseed (anise), cinnamon, turmeric, Indian spices, Asian spices, herb, wintergreen, cherry, berry, red berry, cranberry, peach, apple, orange, mango, clementine, lemon, lime, tropical fruit, papaya, rhubarb, grape, durian, dragon fruit, cucumber, blueberry, mulberry, citrus fruits, Drambuie, bourbon, scotch, whiskey, gin, tequila, rum, spearmint, peppermint, lavender, aloe vera, cardamom, celery, cascarilla, nutmeg, sandalwood, bergamot, geranium, khat, naswar, betel, shisha, pine, honey essence, rose oil, vanilla, lemon oil, orange oil, orange blossom, cherry blossom, cassia, caraway, cognac, jasmine, ylang-ylang, sage, fennel, wasabi, piment, ginger, coriander, coffee, hemp, a mint oil from any species of the genus *Mentha, eucalyptus*, star anise, cocoa, lemongrass, rooibos, flax, *Ginkgo biloba*, hazel, hibiscus, laurel, mate, orange skin, rose, tea such as green tea or black tea, thyme, juniper, elderflower, basil, bay leaves, cumin, oregano, paprika, rosemary, saffron, lemon peel, mint, beefsteak plant, curcuma, cilantro, myrtle, cassis, valerian, pimento, mace, damien, marjoram, olive, lemon balm, lemon basil, chive, carvi, verbena, tarragon, limonene, thymol, camphene), flavour enhancers, bitterness receptor site blockers, sensorial receptor site activators or stimulators, sugars and/or sugar substitutes (e.g., sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening agents. They may be imitation, synthetic or natural ingredients or blends thereof. They may be in any suitable form, for example, liquid such as an oil, solid such as a powder, or gas one or more of extracts (e.g., licorice, hydrangea, Japanese white bark magnolia leaf, chamomile, fenugreek, clove, menthol, Japanese mint, aniseed, cinnamon, herb, wintergreen, cherry, berry, peach, apple, Drambuie, bourbon, scotch, whiskey, spearmint, peppermint, lavender, cardamom, celery, cascarilla, nutmeg, sandalwood, bergamot, geranium, honey essence, rose oil, vanilla, lemon oil, orange oil, cassia, caraway, cognac, jasmine, ylang-ylang, sage, fennel, piment, ginger, anise, coriander, coffee, or a mint oil from any species of the genus *Mentha*), flavour enhancers, bitterness receptor site blockers, sensorial receptor site activators or stimulators, sugars and/or sugar substitutes (e.g., sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening agents. They may be imitation, synthetic or natural ingredients or blends thereof. They may be in any suitable form, for example, oil, liquid, or powder.

In some embodiments, the flavouring material (flavour) may comprise menthol, spearmint and/or peppermint. In some embodiments, the flavour comprises flavour components of cucumber, blueberry, citrus fruits and/or redberry. In some embodiments, the flavour comprises eugenol. In some embodiments, the flavour comprises flavour components extracted from tobacco. In some embodiments, the flavour may comprise a sensate, which is intended to achieve a somatosensorial sensation which are usually chemically induced and perceived by the stimulation of the fifth cranial nerve (trigeminal nerve), in addition to or in place of aroma or taste nerves, and these may include agents providing heating, cooling, tingling, numbing effect. A suitable heat effect agent may be, but is not limited to, vanillyl ethyl ether and a suitable cooling agent may be, but not limited to eucalyptol, WS-3.

The carrier constituent may comprise one or more constituents capable of forming an aerosol. In some embodiments, the carrier constituent may comprise one or more of glycerine, glycerol, propylene glycol, diethylene glycol, triethylene glycol, tetraethylene glycol, 1,3-butylene glycol, erythritol, meso-Erythritol, ethyl vanillate, ethyl laurate, a diethyl suberate, triethyl citrate, triacetin, a diacetin mixture, benzyl benzoate, benzyl phenyl acetate, tributyrin, lauryl acetate, lauric acid, myristic acid, and propylene carbonate.

The one or more other functional constituents may comprise one or more of pH regulators, colouring agents, preservatives, binders, fillers, stabilizers, and/or antioxidants.

As noted above, aerosol provision systems (e-cigarettes) may often comprise a modular assembly including both a reusable part (body—or aerosol provision device) and a replaceable consumable (cartridge) part. Devices conforming to this type of two-part modular configuration may generally be referred to as two-part devices. It is also common for electronic cigarettes to have a generally elongate shape. For the sake of providing a concrete example, certain embodiments of the disclosure described herein may comprise this kind of generally elongate two-part device employing consumable parts. However, it will be appreciated the underlying principles described herein may equally be adopted for other electronic cigarette configurations, for example modular devices comprising more than two parts, as devices conforming to other overall shapes, for example based on so-called box-mod high performance devices that typically have a more boxy shape.

From the forgoing therefore, and with reference to FIG. 1 is a schematic perspective view of an example aerosol provision system (e-cigarette) 1 in accordance with certain embodiments of the disclosure. Terms concerning the relative location of various aspects of the electronic cigarette (e.g. terms such as upper, lower, above, below, top, bottom etc.) are used herein with reference to the orientation of the electronic cigarette as shown in FIG. 1 (unless the context indicates otherwise). However, it will be appreciated this is purely for ease of explanation and is not intended to indicate there is any required orientation for the electronic cigarette in use.

The e-cigarette 1 (aerosol provision system 1) comprises two main components, namely a cartridge 2 and an aerosol provision device 4. The aerosol provision device 4 and the cartridge 2 are shown separated in FIG. 1, but are coupled together when in use.

The cartridge 2 and aerosol provision device 4 are coupled by establishing a mechanical and electrical connection between them. The specific manner in which the mechanical and electrical connection is established is not of primary significance to the principles described herein and may be established in accordance with conventional techniques, for example based around a screw thread, bayonet, latched or friction-fit mechanical fixing with appropriately arranged electrical contacts/electrodes for establishing the electrical connection between the two parts as appropriate. For example electronic cigarette 1 represented in FIG. 1, the cartridge comprises a mouthpiece 33, a mouthpiece end 52 and an interface end 54 and is coupled to the aerosol provision device by inserting an interface end portion 6 at the interface end of the cartridge into a corresponding receptacle 8/receiving section of the aerosol provision device. The interface end portion 6 of the cartridge is a close fit to be receptacle 8 and includes protrusions 56 which engage with corresponding detents in the interior surface of a receptacle wall 12 defining the receptacle 8 to provide a releasable mechanical engagement between the cartridge and the aerosol provision device. An electrical connection is established between the aerosol provision device and the cartridge via a pair of electrical contacts on the bottom of the cartridge (not shown in FIG. 1) and corresponding sprung contact pins in the base of the receptacle 8 (not shown in FIG. 1). As noted above, the specific manner in which the electrical connection is established is not significant to the principles described herein, and indeed some implementations might not have an electrical connection between the cartridge and a aerosol provision device at all, for example because the transfer of electrical power from the reusable part to the cartridge may be wireless (e.g. based on electromagnetic induction techniques).

The electronic cigarette 1 (aerosol provision system) has a generally elongate shape extending along a longitudinal axis L. When the cartridge is coupled to the aerosol provision device, the overall length of the electronic cigarette in this example (along the longitudinal axis) is around 12.5 cm. The overall length of the aerosol provision device is around 9 cm and the overall length of the cartridge is around 5 cm (i.e. there is around 1.5 cm of overlap between the interface end portion 6 of the cartridge and the receptacle 8 of the aerosol provision device when they are coupled together). The electronic cigarette has a cross-section which is generally oval and which is largest around the middle of the electronic cigarette and tapers in a curved manner towards the ends. The cross-section around the middle of the electronic cigarette has a width of around 2.5 cm and a thickness of around 1.7 cm. The end of the cartridge has a width of around 2 cm and a thickness of around 0.6 mm, whereas the other end of the electronic cigarette has a width of around 2 cm and a thickness of around 1.2 cm. The outer housing of the electronic cigarette is in this example is formed from plastic. It will be appreciated the specific size and shape of the electronic cigarette and the material from which it is made is not of primary significance to the principles described herein and may be different in different implementations. That is to say, the principles described herein may equally be adopted for electronic cigarettes having different sizes, shapes and/or materials.

The aerosol provision device 4 may in accordance with certain embodiments of the disclosure be broadly conventional in terms of its functionality and general construction techniques. In the example of FIG. 1, the aerosol provision device 4 comprises a plastic outer housing 10 including the receptacle wall 12 that defines the receptacle 8 for receiving the end of the cartridge as noted above. The outer housing 10 of the aerosol provision device 4 in this example has a generally oval cross section conforming to the shape and size of the cartridge 2 at their interface to provide a smooth transition between the two parts. The receptacle 8 and the end portion 6 of the cartridge 2 are symmetric when rotated through 180° so the cartridge can be inserted into the aerosol provision device in two different orientations. The receptacle wall 12 includes two aerosol provision device air inlet openings 14 (i.e. holes in the wall). These openings 14 are positioned to align with an air inlet 50 for the cartridge when the cartridge is coupled to the aerosol provision device. A different one of the openings 14 aligns with the air inlet 50 of the cartridge in the different orientations. It will be appreciated some implementations may not have any degree of rotational symmetry such that the cartridge is couplable to the aerosol provision device in only one orientation while other implementations may have a higher degree of rotational symmetry such that the cartridge is couplable to the aerosol provision device in more orientations.

The aerosol provision device further comprises a battery 16 for providing operating power for the electronic cigarette, control circuitry 18 for controlling and monitoring the operation of the electronic cigarette, a user input button 20, an indicator light 22, and a charging port 24.

The battery 16 in this example is rechargeable and may be of a conventional type, for example of the kind normally used in electronic cigarettes and other applications requiring provision of relatively high currents over relatively short periods. The battery 16 may be recharged through the charging port 24, which may, for example, comprise a USB connector.

The input button 20 in this example is a conventional mechanical button, for example comprising a sprung mounted component which may be pressed by a user to establish an electrical contact in underlying circuitry. In this regard, the input button may be considered an input device for detecting user input, e.g. to trigger aerosol generation, and the specific manner in which the button is implemented is not significant. For example, other forms of mechanical button or touch-sensitive button (e.g. based on capacitive or optical sensing techniques) may be used in other implementations, or there may be no button and the device may rely on a puff detector for triggering aerosol generation.

The indicator light 22 is provided to give a user with a visual indication of various characteristics associated with the electronic cigarette, for example, an indication of an operating state (e.g. on/off/standby), and other characteristics, such as battery life or fault conditions. Different characteristics may, for example, be indicated through different colours and/or different flash sequences in accordance with generally conventional techniques.

The control circuitry 18 is suitably configured/programmed to control the operation of the electronic cigarette to provide conventional operating functions in line with the established techniques for controlling electronic cigarettes. The control circuitry (processor circuitry) 18 may be considered to logically comprise various sub-units/circuitry elements associated with different aspects of the electronic cigarette's operation. For example, depending on the functionality provided in different implementations, the control circuitry 18 may comprises power supply control circuitry for controlling the supply of power from the battery/power supply to the cartridge in response to user input, user programming circuitry for establishing configuration settings (e.g. user-defined power settings) in response to user input, as well as other functional units/circuitry associated functionality in accordance with the principles described herein and conventional operating aspects of electronic cigarettes, such as indicator light display driving circuitry and user input detection circuitry. It will be appreciated the functionality of the control circuitry 18 can be provided in various different ways, for example using one or more suitably programmed programmable computer(s) and/or one or more suitably configured application-specific integrated circuit(s)/circuitry/chip(s)/chipset(s) configured to provide the desired functionality.

Figure 2:
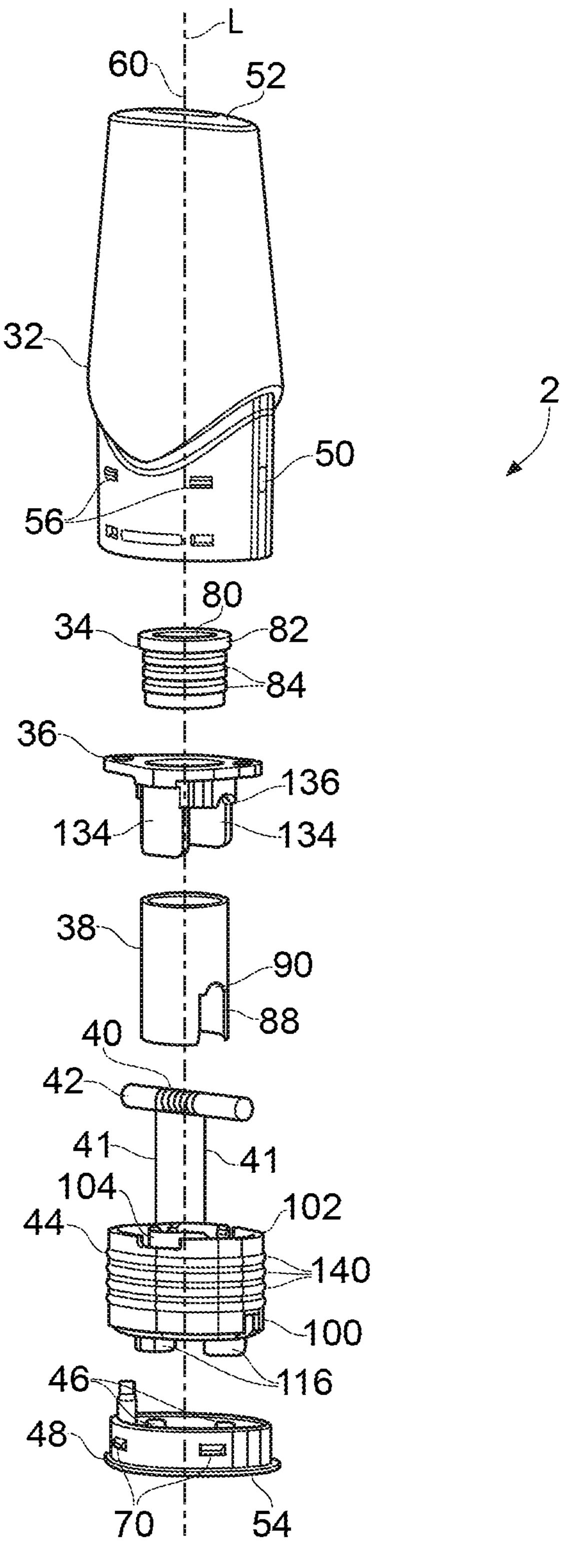
FIG. 2 schematically represents in exploded perspective view of components of the cartridge of the aerosol provision system of FIG. 1.

FIG. 2 is an exploded schematic perspective view of the cartridge 2 (exploded along the longitudinal axis L). The cartridge 2 comprises a housing part 32, an air channel seal 34, a dividing wall element 36, an outlet tube 38, a vaporiser/heating element 40, an aerosolisable material transport element 42, a plug 44, and an end cap 48 with contact electrodes 46. FIGS. 3 to 6 schematically represents some of these components in more detail.

Figure 3A:
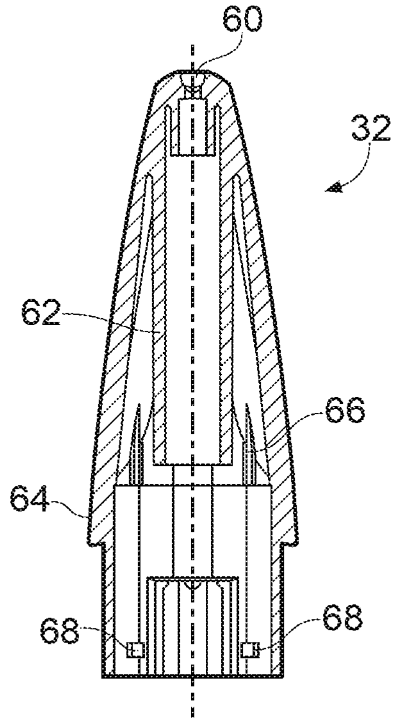
FIGS. 3A to 3C schematically represent various cross-section views of a housing part of the cartridge of the aerosol provision system of FIG. 1.
Figure 3B:
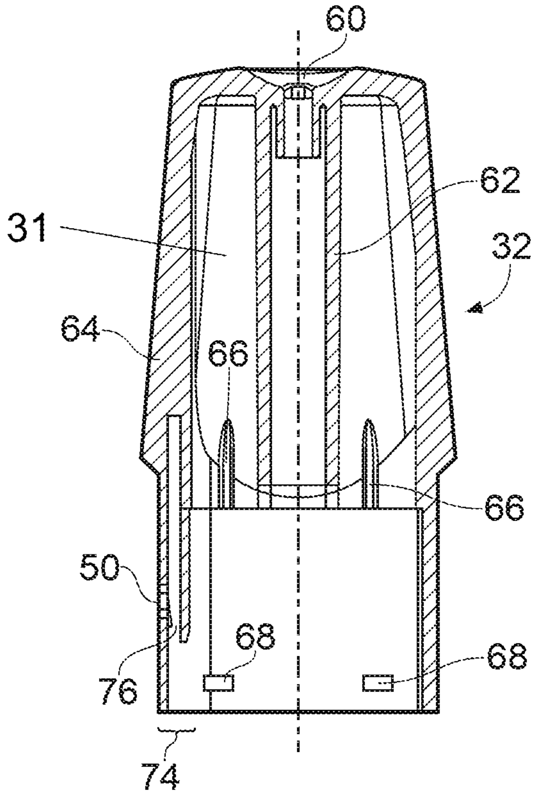
Figure 3C:
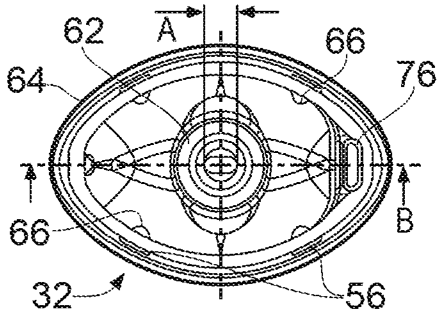

FIG. 3A is a schematic cut-away view of the housing part 32 through the longitudinal axis L where the housing part 32 is thinnest. FIG. 3B is a schematic cut-away view of the housing part 32 through the longitudinal axis L where the housing part 32 is widest. FIG. 3C is a schematic view of the housing part along the longitudinal axis L from the interface end 54 (i.e. viewed from below in the orientation of FIGS. 3A and 3B).

Figure 4A:
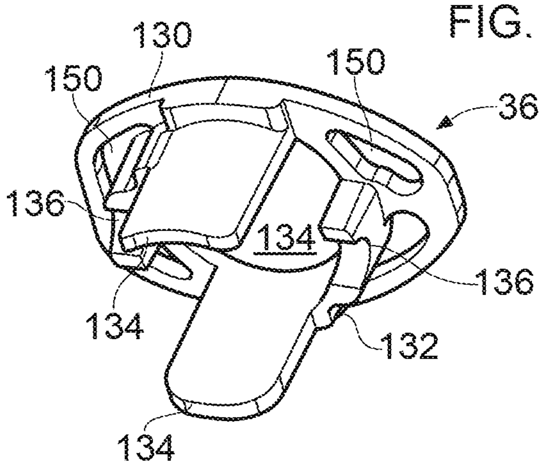
FIGS. 4A and 4B schematically represent a perspective view and a plan view of a dividing wall element of the cartridge of the aerosol provision system of FIG. 1.
Figure 4B:
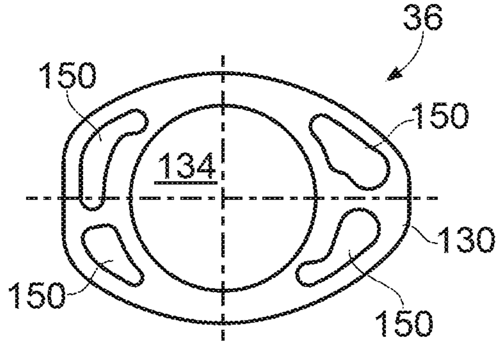

FIG. 4A is a schematic perspective view of the dividing wall element 36 as seen from below. FIG. 4B is a schematic cross-section through an upper part of the dividing wall element 36 as viewed from below.

Figure 5A:
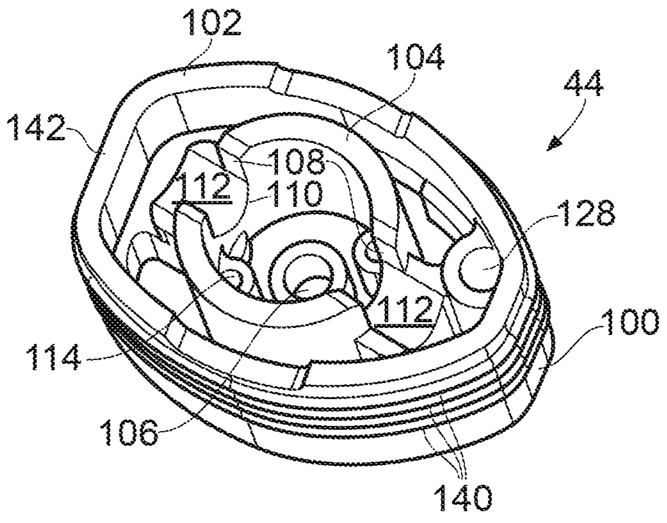
FIGS. 5A to 5C schematically represent two perspective views and a plan view of a resilient plug of the cartridge of the aerosol provision system of FIG. 1.
Figure 5B:
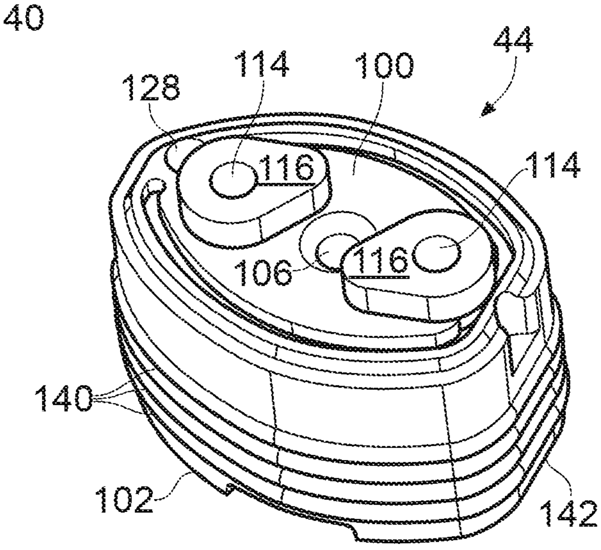
Figure 5C:
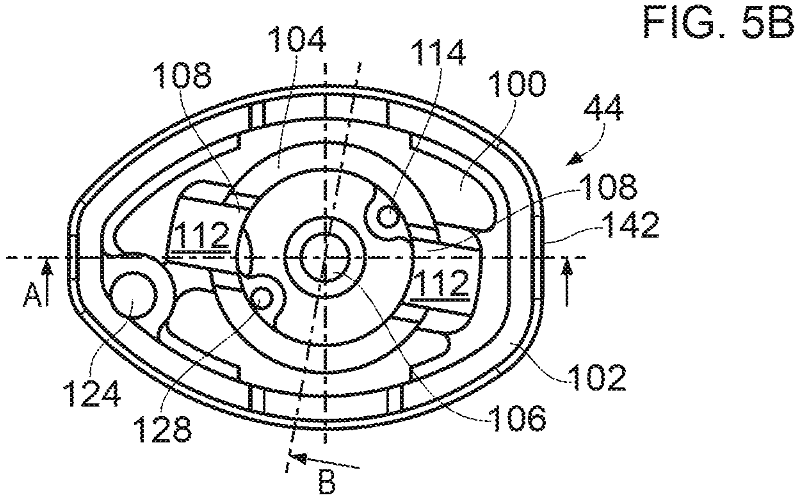

FIG. 5A is a schematic perspective view of the plug 44 from above and FIG. 5B is a schematic perspective view of the plug 44 from below. FIG. 5C is a schematic view of the plug 44 along the longitudinal axis L seen from the mouthpiece end 52 of the cartridge (i.e. viewed from above for the orientation in FIGS. 1 and 2).

Figure 6A:
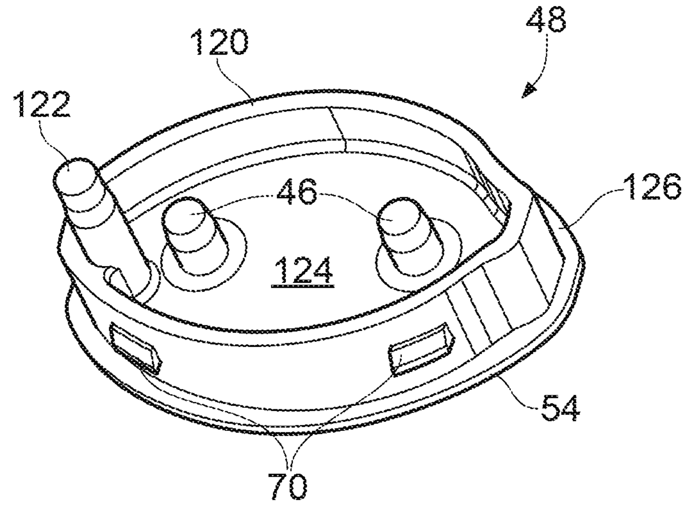
FIGS. 6A and 6B schematically represent a perspective view and a plan view of a bottom cap of the cartridge of the aerosol provision system of FIG. 1.
Figure 6B:
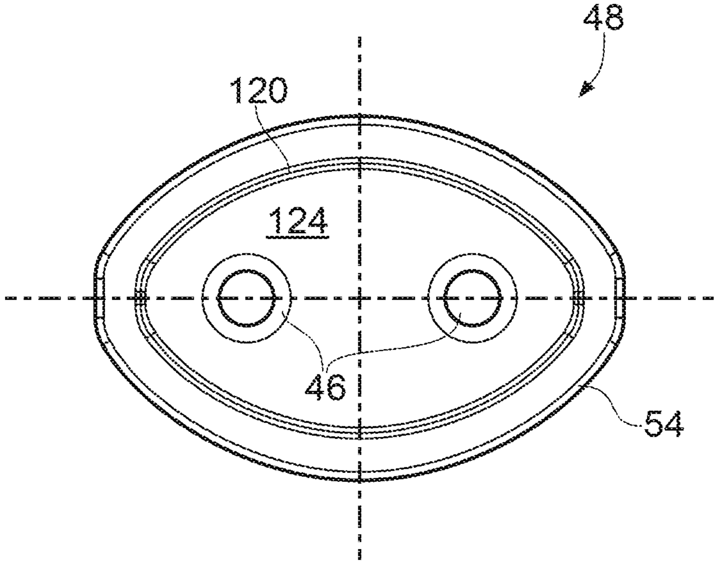

FIG. 6A is a schematic perspective view of the end cap 48 from above. FIG. 6B is a schematic view of the end cap 48 along the longitudinal axis L seen from the mouthpiece end 52 of the cartridge (i.e. from above).

The housing part 32 in this example comprises a housing outer wall 64 and a housing inner tube 62 which in this example are formed from a single moulding of polypropylene. The housing outer wall 64 defines the external appearance of the cartridge 2 and the housing inner tube 62 defines a part the air channel through the cartridge. The housing part is open at the interface end 54 of the cartridge and closed at the mouthpiece end 52 of the cartridge except for a mouthpiece opening/aerosol outlet 60, from the mouthpiece 33, which is in fluid communication with the housing inner tube 62. The housing part 32 includes an opening in a sidewall which provides the air inlet 50 for the cartridge. The air inlet 50 in this example has an area of around 2 $mm^2$. The outer surface of the outer wall 64 of the housing part 32 includes the protrusions 56 discussed above which engage with corresponding detents in the interior surface of the receptacle wall 12 defining the receptacle 8 to provide a releasable mechanical engagement between the cartridge and the aerosol provision device. The inner surface of the outer wall 64 of the housing part includes further protrusions 66 which act to provide an abutment stop for locating the dividing wall element 36 along the longitudinal axis L when the cartridge is assembled. The outer wall 64 of the housing part 32 further comprises holes which provide latch recesses 68 arranged to receive corresponding latch projections 70 in the end cap to fix the end cap to be housing part when the cartridge is assembled.

The outer wall 64 of the housing part 32 includes a double-walled section 74 that defines a gap 76 in fluid communication with the air inlet 50. The gap 76 provides a portion of the air channel through the cartridge. In this example the doubled-walled section 74 of the housing part 32 is arranged so the gap defines an air channel running within the housing outer wall 64 parallel to the longitudinal axis with a cross-section in a plane perpendicular to the longitudinal axis of around 3 $mm^2$. The gap/portion of air channel 76 defined by the double-walled section of the housing part extends down to the open end of the housing part 32.

The air channel seal 34 is a silicone moulding generally in the form of a tube having a through hole 80. The outer wall of the air channel seal 34 includes circumferential ridges 84 and an upper collar 82. The inner wall of the air channel seal 34 also includes circumferential ridges, but these are not visible in FIG. 2. When the cartridge is assembled the air channel seal 34 is mounted to the housing inner tube 62 with an end of the housing inner tube 62 extending partly into the through hole 80 of the air channel seal 34. The through hole 80 in the air channel seal has a diameter of around 5.8 mm in its relaxed state whereas the end of the housing inner tube 62 has a diameter of around 6.2 mm so that a seal is formed when the air channel seal 34 is stretched to accommodate the housing inner tube 62. This seal is facilitated by the ridges on the inner surface of the air channel seal 34.

The outlet tube 38 comprises a tubular section, for instance made of ANSI 304 stainless steel or polypropylene, with an internal diameter of around 8.6 mm and a wall thickness of around 0.2 mm. The bottom end of the outlet tube 38 includes a pair of diametrically opposing slots 88 with an end of each slot having a semi-circular recess 90. When the cartridge is assembled the outlet tube 38 mounts to the outer surface of the air channel seal 34. The outer diameter of the air channel seal is around 9.0 mm in its relaxed state so that a seal is formed when the air channel seal 34 is compressed to fit inside the outlet tube 38. This seal is facilitated by the ridges 84 on the outer surface of the air channel seal 34. The collar 80 on the air channel seal 34 provides a stop for the outlet tube 38.

The aerosolisable material transport element 42 comprises a capillary wick and the vaporiser (aerosol generator)

40 comprises a resistance wire heater wound around the capillary wick. In addition to the portion of the resistance wire wound around the capillary wick, the vaporiser comprises electrical leads 41 which pass through holes in the plug 44 to contact electrodes 46 mounted to the end cap 54 to allow power to be supplied to the vaporiser via the electrical interface the established when the cartridge is connected to an aerosol provision device. The vaporiser leads 41 may comprise the same material as the resistance wire wound around the capillary wick, or may comprise a different material (e.g. lower-resistance material) connected to the resistance wire wound around the capillary wick. In this example the heater coil 40 comprises a nickel iron alloy wire and the wick 42 comprises a glass fibre bundle. The vaporiser and aerosolisable material transport element may be provided in accordance with any conventional techniques and is may comprise different forms and/or different materials. For example, in some implementations the wick may comprise fibrous or solid a ceramic material and the heater may comprise a different alloy. In other examples the heater and wick may be combined, for example in the form of a porous and a resistive material. More generally, it will be appreciated the specific nature aerosolisable material transport element and vaporiser is not of primary significance to the principles described herein.

When the cartridge is assembled, the wick 42 is received in the semi-circular recesses 90 of the outlet tube 38 so that a central portion of the wick about which the heating coil is would is inside the outlet tube while end portions of the wick are outside the outlet tube 38.

The plug 44 in this example comprises a single moulding of silicone, may be resilient. The plug comprises a base part 100 with an outer wall 102 extending upwardly therefrom (i.e. towards the mouthpiece end of the cartridge). The plug further comprises an inner wall 104 extending upwardly from the base part 100 and surrounding a through hole 106 through the base part 100.

The outer wall 102 of the plug 44 conforms to an inner surface of the housing part 32 so that when the cartridge is assembled the plug in 44 forms a seal with the housing part 32. The inner wall 104 of the plug 44 conforms to an inner surface of the outlet tube 38 so that when the cartridge is assembled the plug 44 also forms a seal with the outlet tube 38. The inner wall 104 includes a pair of diametrically opposing slots 108 with the end of each slot having a semi-circular recess 110. Extended outwardly (i.e. in a direction away from the longitudinal axis of the cartridge) from the bottom of each slot in the inner wall 104 is a cradle section 112 shaped to receive a section of the aerosolisable material transport element 42 when the cartridge is assembled. The slots 108 and semi-circular recesses 110 provided by the inner wall of the plug 44 and the slots 88 and semi-circular recesses 90 of the outlet tube 38 are aligned so that the slots 88 in the outlet tube 38 accommodate respective ones of the cradles 112 with the respective semi-circular recesses in the outlet tube and plug cooperating to define holes through which the aerosolisable material transport element passes. The size of the holes provided by the semi-circular recesses through which the aerosolisable material transport element passes correspond closely to the size and shape of the aerosolisable material transport element, but are slightly smaller so a degree of compression is provided by the resilience of the plug 44. This allows aerosolisable material to be transported along the aerosolisable material transport element by capillary action while restricting the extent to which aerosolisable material which is not transported by capillary action can pass through the openings. As noted above, the plug 44 includes further openings 114 in the base part 100 through which the contact leads 41 for the vaporiser pass when the cartridge is assembled. The bottom of the base part of the plug includes spacers 116 which maintain an offset between the remaining surface of the bottom of the base part and the end cap 48. These spacers 116 include the openings 114 through which the electrical contact leads 41 for the vaporiser pass.

The end cap 48 comprises a polypropylene moulding with a pair of gold-plated copper electrode posts 46 mounted therein.

The ends of the electrode posts 44 on the bottom side of the end cap are close to flush with the interface end 54 of the cartridge provided by the end cap 48. These are the parts of the electrodes to which correspondingly aligned sprung contacts in the aerosol provision device 4 connect when the cartridge 2 is assembled and connected to the aerosol provision device 4. The ends of the electrode posts on the inside of the cartridge extend away from the end cap 48 and into the holes 114 in the plug 44 through which the contact leads 41 pass. The electrode posts are slightly oversized relative to the holes 114 and include a chamfer at their upper ends to facilitate insertion into the holes 114 in the plug where they are maintained in pressed contact with the contact leads for the vaporiser by virtue of the plug.

The end cap has a base section 124 and an upstanding wall 120 which conforms to the inner surface of the housing part 32. The upstanding wall 120 of the end cap 48 is inserted into the housing part 32 so the latch projections 70 engage with the latch recesses 68 in the housing part 32 to snap-fit the end cap 48 to the housing part when the cartridge is assembled. The top of the upstanding wall 120 of the end cap 48 abuts a peripheral part of the plug 44 and the lower face of the spacers 116 on the plug also abut the base section 124 of the plug so that when the end cap 48 is attached to the housing part it presses against the resilient part 44 to maintain it in slight compression.

The base portion 124 of the end cap 48 includes a peripheral lip 126 beyond the base of the upstanding wall 112 with a thickness which corresponds with the thickness of the outer wall of the housing part at the interface end of the cartridge. The end cap also includes an upstanding locating pin 122 which aligns with a corresponding locating hole 128 in the plug to help establish their relative location during assembly.

The dividing wall element 36 comprises a single moulding of polypropylene and includes a dividing wall 130 and a collar 132 formed by projections from the dividing wall 130 in the direction towards the interface end of the cartridge. The dividing wall element 36 has a central opening 134 through which the outlet tube 38 passes (i.e. the dividing wall is arranged around the outlet tube 38). In some embodiments, the dividing wall element 36 may be integrally formed with the outlet tube 38. When the cartridge is assembled, the upper surface of the outer wall 102 of the plug 44 engages with the lower surface of the dividing wall 130, and the upper surface of the dividing wall 130 in turn engages with the projections 66 on the inner surface of the outer wall 64 of the housing part 32. Thus, the dividing wall 130 prevents the plug from being pushed too far into the housing part 32—i.e. the dividing wall 130 is fixedly located along the longitudinal axis of the cartridge by the protrusions 66 in the housing part and so provides the plug with a fixed surface to push against. The collar 132 formed by projections from the dividing wall includes a first pair of opposing projections/tongues 134 which engage with corresponding recesses on an inner surface of the outer wall 102 of the plug 44. The protrusions from the dividing wall 130 further provide a pair of cradle sections 136 configured to engage with corresponding ones of the cradle sections 112 in the part 44 when the cartridge is assembled to further define the opening through which the aerosolisable material transport element passes.

When the cartridge 2 is assembled an air channel extending from the air inlet 50 to the aerosol outlet 60 through the cartridge is formed. Starting from the air inlet 50 in the side wall of the housing part 32, a first section of the air channel is provided by the gap 76 formed by the double-walled section 74 in the outer wall 64 of the housing part 32 and extends from the air inlet 50 towards the interface end 54 of the cartridge and past the plug 44. A second portion of the air channel is provided by the gap between the base of the plug 44 and the end cap 48. A third portion of the air channel is provided by the hole 106 through the plug 44. A fourth portion of the air channel is provided by the region within the inner wall 104 of the plug and the outlet tube around the vaporiser 40. This fourth portion of the air channel may also be referred to as an aerosol/aerosol generation region, it being the primary region in which aerosol is generated during use. The air channel from the air inlet 50 to the aerosol generation region may be referred to as an air inlet section of the air channel. A fifth portion of the air channel is provided by the remainder of the outlet tube 38. A sixth portion of the air channel is provided by the outer housing inner tube 62 which connects the air channel to the aerosol outlet 60, which is located at an end of the mouthpiece 33. The air channel from the aerosol generation region to be the aerosol outlet may be referred to as an aerosol outlet section of the air channel.

Also, when the cartridge is assembled a reservoir 31 for aerosolisable material is formed by the space outside the air channel and inside the housing part 32. This may be filled during manufacture, for example through a filling hole which is then sealed, or by other means. The specific nature of the aerosolisable material, for example in terms of its composition, is not of primary significance to the principles described herein, and in general any conventional aerosolisable material of the type normally used in electronic cigarettes may be used. The present disclosure may refer to a liquid as the aerosolisable material, which as mentioned above may be a conventional e-liquid. However, the principles of the present disclosure apply to any aerosolisable material which has the ability to flow, and may include a liquid, a gel, or a solid, where for a solid a plurality of solid particles may be considered to have the ability to flow when considered as a bulk.

The reservoir is closed at the interface end of the cartridge by the plug 44. The reservoir includes a first region above the dividing wall 130 and a second region below the dividing wall 130 within the space formed between the air channel and the outer wall of the plug. The aerosolisable material transport element (capillary wick) 42 passes through openings in the wall of the air channel provided by the semi-circular recesses 108, 90 in the plug 44 and the outlet tube 38 and the cradle sections 112, 136 in the plug 44 and the dividing wall element 36 that engage with one another as discussed above. Thus, the ends of the aerosolisable material transport element extend into the second region of the reservoir from which they draw aerosolisable material through the openings in the air channel to the vaporiser 40 for subsequent vaporisation.

In normal use, the cartridge 2 is coupled to the aerosol provision device 4 and the aerosol provision device activated to supply power to the cartridge via the contact electrodes 46 in the end cap 48. Power then passes through the connection leads 41 to the vaporiser 40. The vaporiser is thus electrically heated and so vaporises a portion of the aerosolisable material from the aerosolisable material transport element in the vicinity of the vaporiser. This generates aerosol in the aerosol generation region of the air path. Aerosolisable material that is vaporised from the aerosolisable material transport element is replaced by more aerosolisable material drawn from the reservoir by capillary action. While the vaporiser is activated, a user inhales on the mouthpiece end 52 of the cartridge. This causes air to be drawn through whichever aerosol provision device air inlet 14 aligns with the air inlet 50 of the cartridge (which will depend on the orientation in which the cartridge was inserted into the aerosol provision device receptacle 8). Air then enters the cartridge through the air inlet 50, passes along the gap 76 in the double-walled section 74 of the housing part 32, passes between the plug 44 and the end cap 48 before entering the aerosol generation region surrounding the vaporiser 40 through the hole 106 in the base part 100 of the plug 44. The incoming air mixes with aerosol generated from the vaporiser to form a condensation aerosol, which is then drawn along the outlet tube 38 and the housing part inner 62 before exiting through the mouthpiece outlet/aerosol outlet 60 for user inhalation.

From the above FIGS. 1-6B, it can be seen a possible embodiment construction of aerosol provision system 1 which is configured for generating an aerosol, which is suitable for use in the context of the present disclosure (alongside potentially other forms of aerosol provision system).

Figure 7:
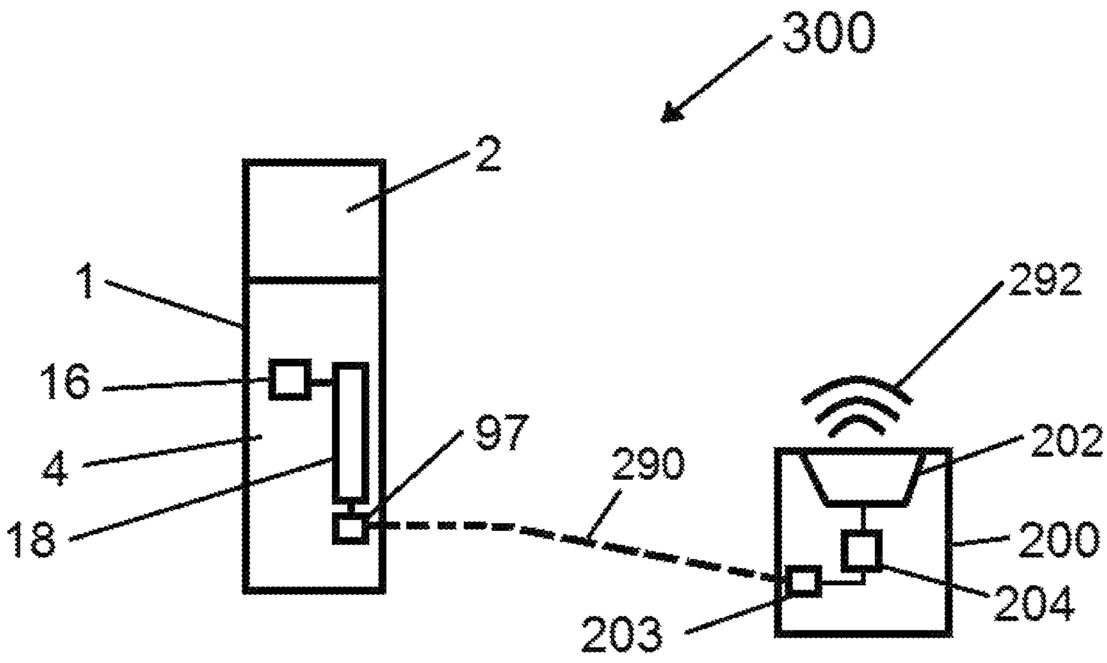
FIG. 7 schematically represents embodiments of feedback provision system, useable with an aerosol provision system such as that shown in FIGS. 1-6B, and comprising an audio output device which is configured to output acoustic feedback in response to receiving a signal which is initially transmitted by the aerosol provision system, in accordance with certain embodiments of the disclosure.
Figure 8A:
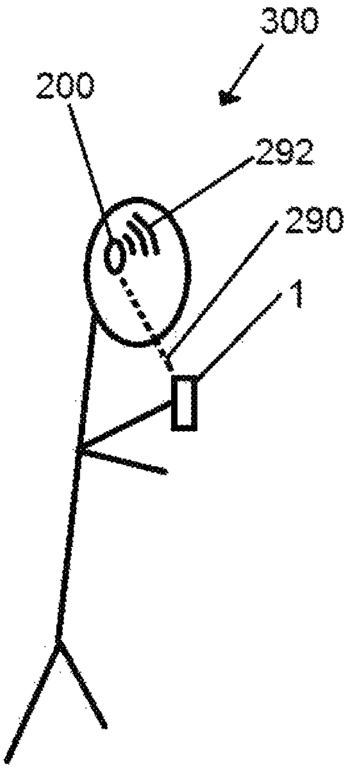
FIG. 8A schematically represents an embodiment of feedback provision system, in accordance with certain embodiments of the disclosure, where the audio output device comprises a headphone or hearing aid.
Figure 8B:
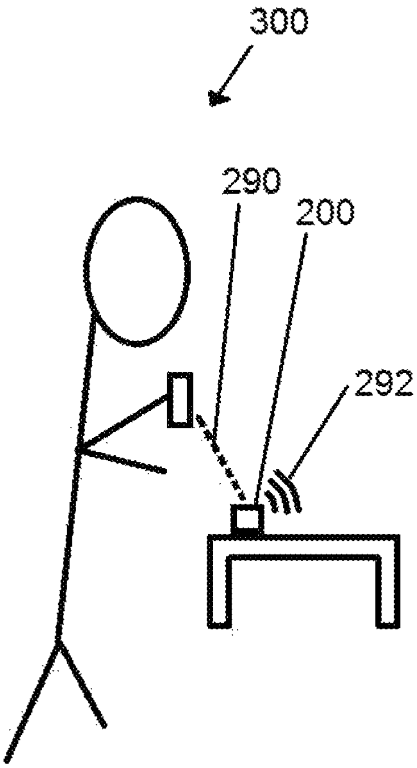
FIG. 8B schematically represents an embodiment of feedback provision system, in accordance with certain embodiments of the disclosure, where the audio output device comprises a loudspeaker which is remotely located from the aerosol provision system (namely on a table).
Figure 9:
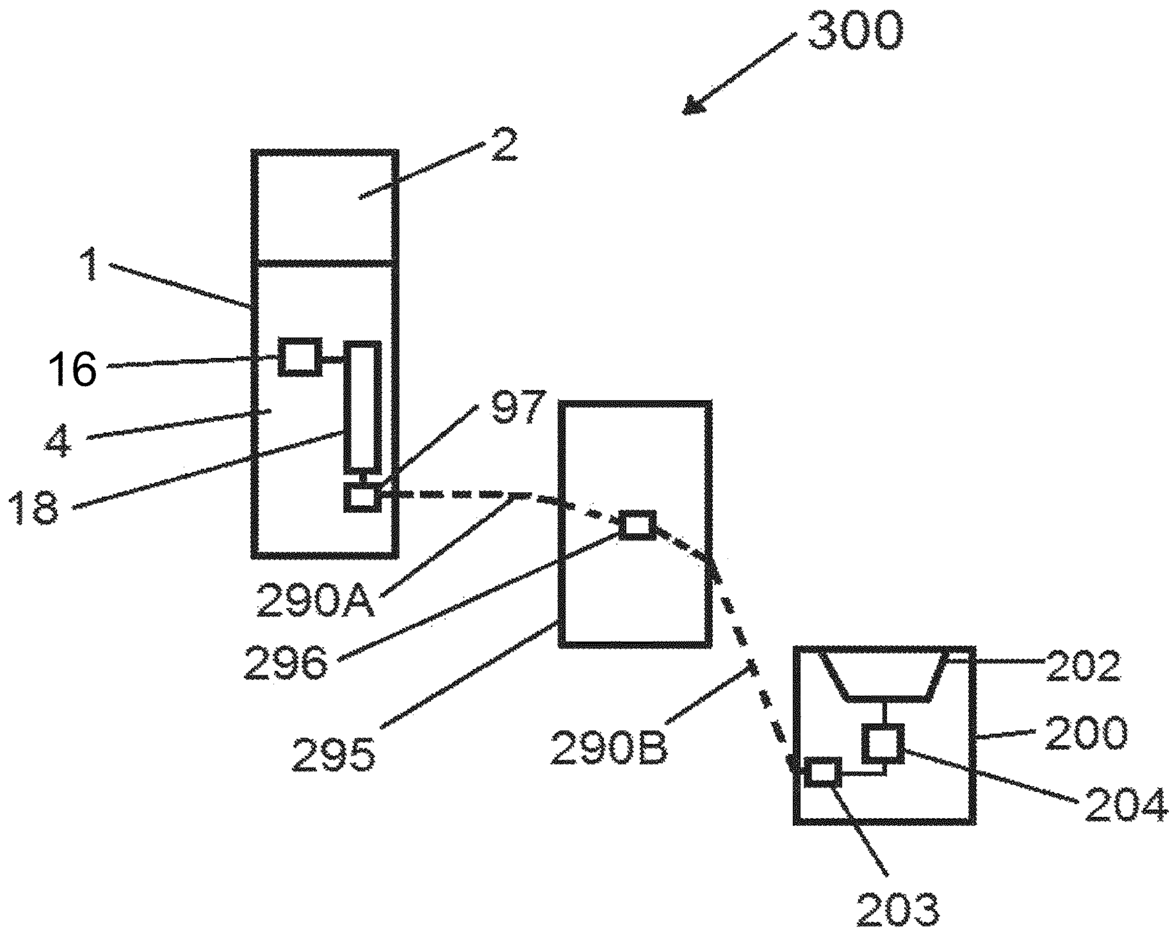
FIG. 9 schematically represents embodiments of feedback provision system, useable with an aerosol provision system such as that shown in FIGS. 1-6B, and comprising an audio output device which is configured to output acoustic feedback in response to receiving a signal which is initially transmitted by the aerosol provision system, in accordance with certain embodiments of the disclosure, wherein the aerosol provision system is configured to transmit the signal to the audio output device via an intermediary device.

Turning now to FIGS. 7-9, the present disclosure also provides for a feedback provision system 300 comprising an aerosol provision system 1 for generating an aerosol. The feedback system also comprises an audio output device 200 for outputting acoustic feedback to a user of the aerosol provision system. In this way, the audio output device 200 may be then configured to output the acoustic feedback in response to receiving a signal 290, or more specifically a feedback signal, which is initially transmitted by the aerosol provision system 1. In this way, the signal/feedback signal 290 may be configured for controlling the audio output device 200.

At a general level therefore, it may be seen that the audio output device 200 is configured to be controlled by the aerosol provision system 1, to allow the audio output device 200 to output a sound; an audible prompt; a jingle; a fixed tone; and/or some other audible cue (i.e. each of these being 'acoustic feedback' 292 at a general level), following receipt of an appropriate signal 290 to do so from the aerosol provision system 1. In this way, the user may then be able to detect/hear this acoustic feedback 292 (which could be a sound or some other audible prompt as noted above) for the user to then take appropriate action in response. Indeed, the acoustic feedback 292 in accordance with some embodiments may comprise feedback which is indicative of a predetermined function/operation/characteristic of the aerosol provision system 1, and/or indicative of a predetermined event relating to the aerosol provision system as having being satisfied, and/or having being determined as being satisfied by the aerosol provision system 1, as will be described.

Particularly for those individuals who might have a visual impairment, and/or for use in conditions where general visibility is otherwise low or poor, it may be appreciated that this functionality of the aerosol provision system 1 to therefore effect/control the operation of the audio output device 200 may thus allow for acoustic feedback 292 to be appropriately provided in these conditions.

Noting the above, and with reference to any such audio output device 200, it is noted that in accordance with some embodiments (such as those shown in the embodiments of FIGS. 7-9), the audio output device 200 may be remotely located from the aerosol provision system 1. In this way, and/or put differently, in accordance with some embodiments, the aerosol provision system 1 may not comprise the audio output device 200.

In this respect as well, and in so far as the audio output device 200 may be remotely located from the aerosol provision system 1, it is envisaged in some embodiments that the aerosol provision system 1 may be configured to wirelessly transmit the signal 290 directly to the audio output device 200, as opposed to via a wired connection between the aerosol provision system 1 and the audio output device 200. Via the use of a wireless connection, this may therefore facilitate easier maneuverability for the user whilst they are using the aerosol provision system 1 (and its associated audio output device 200). Although not necessarily, in a particularly convenient embodiment, the (feedback) signal 290 from the aerosol provision system 1 may be wirelessly transmitted by the aerosol provision system 1 by Bluetooth®, or via a Wi-Fi connection in accordance with some embodiments.

The above being said, a wired connection may appreciably be additionally/alternatively employed in accordance with some embodiments, particularly in instances where a more reliable connection is required between the aerosol provision system 1 and its associated audio output device 200. In this way, the aerosol provision system 1 may be configured to transmit the (feedback) signal 290 to the audio output device 200 by a wired, or physical, connection between the aerosol provision system 1 and the audio output device 200. Or put differently, in accordance with some related embodiments, the aerosol provision system 1 may be physically connected to the audio output device 200.

In accordance with some embodiments where a wired connection is employed, it may be appreciated that this may help reduce battery consumption from otherwise transmitting the signal from the aerosol provision system 1 to the audio output device 200 by a wireless connection. Where a wired connection is employed, appreciably in accordance with some narrower embodiments, the wired connection may comprise a cable connection (such as a USB connection, or Lightning® connection, in accordance with some particularly narrow embodiments) between the aerosol provision system 1 and the audio output device 200. In a very particular embodiment, the aerosol provision system 1 may comprise an audio output port for allowing a wired connection with the audio output device 200. Appreciably, such an audio output port could appreciably comprise a 3.5 mm or a 6.35 mm audio output port in a very particular embodiment.

Appreciating the foregoing, in accordance with some embodiments (such as those shown in the embodiments from FIGS. 7-8B), the aerosol provision system 1 may be configured to transmit any signal/feedback signal 290 directly to the audio output device 200, for instance as opposed to providing/transmitting the signal via a mobile phone or some other intermediary electronic device. In this way, the reliability and speed of transmission of the signal from the aerosol provision system 1 to the audio output device 200 may be improved.

Appreciably however, it is envisaged that the feedback provision system 300 herein provided may, in accordance with some embodiments (such as the embodiment from FIG. 9), further comprise an intermediary device 295, or second device 295, for conveying the signal 290 from the aerosol provision system 1 to the audio output device 200. Such a second or intermediary device 295, in accordance with some embodiments, may comprise a dongle or a mobile phone, as shown in the embodiment of FIG. 9, for instance. Appreciably, any such intermediary device 295 may be then configured to receive the signal 290A from the aerosol provision system 1, and be configured to transmit the signal (see signal 290B from FIG. 9) to the audio output device 200 (for instance via a wireless transceiver 296), in accordance with some particularly narrow embodiments where the signal is wirelessly transmitted from the aerosol provision system 1 and/or wirelessly transmitted to the audio output device 200.

Noting the above, it may be seen that the aerosol provision system 1 may transmit the signal 290 to the audio output device 200 in a number of different ways. As to the nature of this audio output device 200, it is envisaged that this could comprise any form of electroacoustic transducer 202 which is configured to output a sound signal. This being the case therefore, and in accordance with some embodiments, the audio output device 200 may comprise at least one of a loudspeaker (as shown in the embodiment of FIG. 8B); or a headphone or earphone (as shown in the embodiment of FIG. 8A). In this way, the feedback provision system 300 may be particularly effective at providing feedback 292, in the form of acoustic feedback, which can be perceived by the user in low-light conditions or in conditions where user visibility is otherwise restricted/poor.

Additionally/alternatively however, in accordance with some embodiments, the audio output device 200 may comprise a bone conduction audio output device; and/or even a hearing aid (as shown in the embodiment of FIG. 8A). In this way, the feedback provision system 300 may be particularly effective at providing feedback 292, in the form of acoustic feedback, which can be perceived by those who have a hearing impediment, or for those who might not otherwise be able to hear acoustic feedback delivered from an electroacoustic transducer 202 located on the aerosol provision system 1 itself.

With respect to any feedback signal 290 which is transmitted to the audio output device 200, the feedback signal may in accordance with some embodiments appreciably comprise an audio output signal which is configured to be output by the audio output device as part of the acoustic feedback. In this way, the feedback signal may provide the audio output device with a signal which can be conveniently directly output with minimal subsequent processing by further intermediary electronics.

Staying with the signal 290, in accordance with some particular embodiments, the feedback signal may be conveniently configured to be transmitted by the aerosol provision system 1 in response to a predetermined event being satisfied, and/or in response to a predetermined event being determined as being satisfied by the aerosol provision system. In this way, the acoustic feedback may be output by the audio output device for providing a prompt/notification that the predetermined event has occurred/been satisfied.

As to what such a predetermined event might be, appreciably this could comprise a number of different things, depending on the intended application of the acoustic feedback which is to be outputted.

For instance, in accordance with some embodiments, and at a general level, the predetermined event may comprise the aerosol provision system 1 changing from a first mode of operation to a second mode of operation. For instance, in accordance with some embodiments, either of these modes of operation may comprise a standby mode; a sleep mode; or an off status. In this way, and in accordance with some narrower or alterative embodiments, the other of these modes of operation may comprise a standby mode; a sleep mode; or an off status (which is not the same as the first mode of operation). By virtue of this functionality therefore, the acoustic feedback 292 may provide an indication that the aerosol provision system 1 has changed between these two modes of operation, which could be particularly helpful if this change of mode of operation inadvertently happens (e.g. whilst the aerosol provision system 1 is in a pocket, or bag, where the user may not otherwise be able to visually determine that the change of mode of operation has occurred).

Appreciably as well, noting the above disclosure, in accordance with some embodiments, the predetermined event may comprise at least one of; i) the aerosol provision system being switched on; and/or ii) the aerosol provision system being switched off.

Related to the above as well, in accordance with some embodiments, and particularly those where the aerosol provision system 1 comprises an aerosol generator 40, for aerosolising aerosol-generating material, for generating the aerosol, in accordance with some embodiments thereof, the predetermined event may comprise any combination of:

i) the aerosol generator being operated;

ii) the aerosol generator being switched on; and/or iii) the aerosol generator being switched off.

Thus again, in so far as such a change of operation of the aerosol generator 40 occurs, the acoustic feedback 292 may provide a (confirmatory) indication that this has occurred, so the user can react in instances when this change in operation is otherwise unexpected.

Where the aerosol generator 40 is employed, the predetermined event in accordance with some embodiments may comprise the aerosol generator 40 exceeding a predetermined temperature, which could be indicative of there being a fault with the aerosol generator 40, and/or could be indicative of a predetermined low amount of aerosol-generating material remaining in the aerosol provision system 1. Thus in such embodiments, the acoustic feedback 292 may provide a (confirmatory) indication that the aerosol provision system 1 is subject to one of these conditions/statuses, or any other condition or status—adverse or otherwise.

As is clear from the embodiments disclosed at FIGS. 1-6B at least, it is envisaged in accordance with some embodiments that any aerosol provision system 1 employed as part of the feedback provision system 300 may comprise an aerosol provision device 4; and a consumable 2 for releasably engaging with the aerosol provision device 4, wherein the consumable 4 is configured for receiving aerosol-generating material for aerosolising into the aerosol.

Noting the above disclosures therefore, it is clear that also provided herein may be an aerosol provision system 1 for generating an aerosol, wherein the aerosol provision system 1 is configured to wirelessly transmit a feedback signal 290 to an audio output device 200, wherein the feedback signal 290 is configured for controlling the audio output device 200. In this way, and in accordance with some embodiments, the feedback signal 290 may be configured to control the audio output device 200 to output acoustic feedback 292 (which could relate, in some embodiments, to any of the above noted purposes/applications for such feedback).

To be clear as well, it is noted that the present disclosure is also intended to be used as part of wider methods of delivering acoustic feedback, such as a method of delivering acoustic feedback 292 to an audio output device 200 of a user of an aerosol provision system 1, using a feedback signal 290 transmitted from the aerosol provision system 1 to the audio output device 200, wherein the feedback signal 290 is configured for controlling the audio output device 200.

It will also be appreciated that the above disclosure may be used in the context of other aerosol provision system 1, such as those disclosed with reference to the disclosure from FIGS. 1-6B, for retrofitting these aerosol provision system s1 to be used as part of the herein recited feedback provision systems 300. Accordingly, the present disclosure also is intended to cover such retrofitting applications, such as a method of retrofitting an aerosol provision system 1 (using appropriate alterations to the functionality of the aerosol provision system, e.g. in respect of any controller/control circuitry 18 therefrom) to deliver acoustic feedback 292 as part of a feedback provision system 300 comprising the aerosol provision system 1 and an audio output device 200, the method comprising:

providing the aerosol provision system 1 with instructions which, when executed by a controller 18 of the aerosol provision system 1, cause the controller 18 to:

generate a feedback signal which is configured to be wirelessly transmitted to an audio output device 200, wherein the feedback signal 290 is configured for controlling the audio output device 200; and wirelessly transmitting the feedback signal 290 from the aerosol provision system 1 for allowing the feedback signal 290 to be received by the audio output device 200.

Appreciating the foregoing therefore, there has accordingly been described a variety of different feedback provision systems, aerosol provision systems, and corresponding methods employing the same, which all look to provide for feedback signals and corresponding acoustic feedback arrangements which can be used to provide acoustic feedback from an aerosol provision system to a user thereof.

Bearing this in mind, the above noted disclosures may thus appreciably relate to the additional embodiments as set out in the following numbered clauses at the end of this specification, alongside the other noted embodiments from the below noted claims.

There has also been described an aerosol provision system 1 for generating an aerosol, wherein the aerosol provision system 1 is configured to wirelessly transmit a feedback signal 290 to an audio output device 200. The feedback signal 290 is configured for controlling the audio output device 200, which may be a loudspeaker, headphone, or earphone. In some cases, the feedback signal 290 is configured to be wirelessly transmitted by the aerosol provision system 1 in response to a predetermined event being determined as being satisfied by the aerosol provision system 290. In this way, the feedback signal 290 can used as a means to ultimately provide the user, via the audio output device 200, an indication of a current status of the aerosol provision system 1.

In order to address various issues and advance the art, this disclosure shows by way of illustration various embodiments in which the claimed invention(s) may be practiced. The advantages and features of the disclosure are of a representative sample of embodiments only, and are not exhaustive and/or exclusive. They are presented only to assist in understanding and to teach the claimed invention (s). It is to be understood that advantages, embodiments, examples, functions, features, structures, and/or other aspects of the disclosure are not to be considered limitations on the disclosure as defined by the claims or limitations on equivalents to the claims, and that other embodiments may be utilised and modifications may be made without departing from the scope of the claims. Various embodiments may suitably comprise, consist of, or consist essentially of, various combinations of the disclosed elements, components, features, parts, steps, means, etc. other than those specifically described herein, and it will thus be appreciated that features of the dependent claims (or any herein recited dependent clauses) may be combined with features of the independent claims (or independent clauses) in combinations other than those explicitly set out in the claims or clauses. The disclosure may include other inventions not presently claimed, but which may be claimed in future. Accordingly, any permutation of the features from the claims may be combined as required, and/or may be combined with any permutation of the features from the herein recited clauses at the end of this specification.

Purely for completeness, with respect to any employed embodiments where the aerosol provision system 1 may be configured to wirelessly transmit the signal 290 to the audio output device 200, it may be appreciated that in accordance with such embodiments, the aerosol provision system 1 and the corresponding audio output device 200 may be configured appropriately to effect this wireless communication.

For instance, in accordance with some of these embodiments, the aerosol provision system 1 may comprise a transmitter 96, connected to the control circuitry 18 of the aerosol provision system 1, for transmitting the wireless signal 290. In this way, and as required, the audio output device 200 may then potentially also comprise a receiver 203 for receiving the wireless signal 290. Where appropriate as well, the audio output device 200 in accordance with some embodiments may be also provided with a controller or control circuitry 204, for receiving the signal 290 from the receiver 203, for controlling the operation of any electroacoustic transducer 202 which is otherwise employed as part of the audio output device 200. Appreciably however, it is not necessarily the case that such a controller or control circuitry 204 from the audio output device 200 be employed, in so far as the delivered signal 290 may in accordance with some embodiments directly comprise the audio output signal as noted previously.

Equally, and for completeness as well, in so far as any other forms of wireless communication are employed, such as Bluetooth®, a corresponding Bluetooth pairing arrangement may appreciably be provided between the aerosol provision system 1 and the audio output device 200 (and potentially also between any intermediary device 295 in the case of embodiments along the lines of the embodiment shown in FIG. 9).

In respect of the disclosure as noted above as well, it will also be appreciated that this disclosure may thus allow for any herein described aerosol provision system 1 (or aerosol provision device 4) to be configured to output a notification for confirming when the aerosol provision system (or aerosol provision device 4) is connected with the audio output device 200.

Thus at a general level, the present disclosure may thus also provide for an aerosol provision system 1 (or aerosol provision device 4) for generating an aerosol, wherein the aerosol provision system 1 (or aerosol provision device 4) is configured to be connected with an audio output device 200 for outputting acoustic feedback to a user of the aerosol provision system; wherein the aerosol provision system 1 (or aerosol provision device 4) is configured to output a notification for confirming when the aerosol provision system 1 (or aerosol provision device 4) is connected with the audio output device 200. Thus by virtue of such arrangements, this may allow for a user to better understand when their aerosol provision system 1 is suitably connected with the audio output device 200 (such as a hearing aid, as shown in the embodiment of FIG. 8A).

In accordance with such embodiments, for example, it may be the case that there is provided a display, for instance on the aerosol provision system 1 or aerosol provision device 4, or perhaps even the intermediary device 295 (such as the user's mobile phone) where this is employed, about which the notification is configured to be output.

In so far as any notification is output, it may be appreciated in some embodiments that this notification may comprise a predetermined symbol, such as in some narrower embodiments an image of a hearing aid, or an image of a loudspeaker, such to allow a user to more easily visually identify when the audio output device 200 is suitably connected. In some embodiments, the notification may comprise the illumination of at least one LED (or light) from the aerosol provision system 1 or aerosol provision device 4. Where such illumination is provided, the illumination of at least one LED (or light) may comprise illumination in a predetermined colour (such as purple, or blue, and/or some other predetermined colour), and which might in some narrower embodiments be a colour which is not used for any other type of intended notification for the LED or light (e.g. the colour red, which might be indicative of a fault, or the colour green for indicating a vaporiser operation from the aerosol provision system 1). In some embodiments, the illumination of at least one LED (or light) may comprise illumination in a predetermined sequence of illuminations of the at least one LED/light (e.g. a sequence of four repeated illuminations in succession, and/or any predetermined combination of relatively shorter LED/light flashes with relatively longer LED/light flashes). In a very particular embodiment, any such LED/light may comprise the indicator light 22 as shown in the embodiment from FIG. 1.

Where any such notification is employed, it may be appreciated in some embodiments that the notification may be output for as long as the aerosol provision system 1 (or device 4) is connected with the audio output device 200. Equally, in some potential additional/alternative embodiments, the aerosol provision system 1; the aerosol provision device 4; and/or potentially even the intermediary device 295, where employed; may be configured to stop outputting the notification when the aerosol provision system 1 (or device 4) is no longer connected with the audio output device 200. In some embodiments, the aerosol provision system 1; the aerosol provision device 4; and/or the intermediary device 295; may be configured to immediately stop outputting the notification as soon as the aerosol provision system 1 (or device 4) is no longer connected with the audio output device 200, to give the user a faster, more instantaneous, notification when the connection has stopped.

Appreciably as well, in some embodiments, the notification may be configured to change when the aerosol provision system 1, or device 4, is no longer connected with the audio output device 200, to a second notification (e.g. to a different symbol). In this way, any user may then more easily identify when the connection has stopped through the provision of this second (different) notification.

From the above disclosure therefore, it may be appreciated as well that the present disclosure may thus also provide for a mobile phone 295, or more generally any other portable electrical device (such as a tablet), configured to be connected with: i) an aerosol provision system for generating an aerosol; and ii) an audio output device, configured to be connected with the aerosol provision system, and configured for outputting acoustic feedback to a user of the aerosol provision system; wherein the mobile phone is configured to output a notification for confirming when the aerosol provision system is connected with the audio output device 200.

Equally as well, the disclosure may thus also, in some embodiments, provide for a mobile phone 295 configured to be connected with: i) an aerosol provision device for use in an aerosol provision system comprising the aerosol provision device and a consumable for releasably engaging with the aerosol provision device; and ii) an audio output device, configured to be connected with the aerosol provision device, and configured for outputting acoustic feedback to a user of the aerosol provision device; wherein the mobile phone is configured to output a notification for confirming when the aerosol provision device 4 is connected with the audio output device 200.

Such embodiments are thus as also described in the second set of clauses at the end of this specification.

In these embodiments therefore, the provision of the mobile phone (or more generally any other intermediary device 295, or other portable electrical device) may thus facilitate the user from understanding when their respective aerosol provision system 1, or aerosol provision device 4, is connected with its associated audio output device 200 (such as a loudspeaker, and/or a hearing aid).

For such embodiments, it may be entirely appreciated that in some cases, the mobile phone may be configured to output the notification as part of an app from the mobile phone (or any other portable electrical device). In so far as any app is employed, to allow the notification functionality to be used as part of other configurable aspects from the app, in some embodiments the mobile phone may be configured to output the notification as part of a dashboard (such as a first, home, screen) from the app from the mobile phone, wherein the dashboard is configured to further allow at least one setting or operation of the aerosol provision system, or of the aerosol provision device, to be changed. Such a setting or operation in some embodiments might include an operation to i) lock or unlock the aerosol provision system 1 (or device 4); ii) an operation to control the ability of, and/or prevent, the aerosol provision system from generating an aerosol; and/or iii) an operation to modify the power supplied to a vaporiser 40 of the aerosol provision system 1.

For completeness as well, where any such mobile phone (or wider intermediary device 295, or portable electrical device, is employed), in some embodiments the mobile phone may be configured to allow a user to vary a predetermined parameter of the acoustic feedback, for instance by using any provided dashboard from the app. Such a predetermined parameter, appreciably, could in some embodiments be a volume of the acoustic feedback, and/or a duration of the acoustic feedback, and could in some embodiments be effected/varied using a slider or some other selectable button from the dashboard of the app. In this way, the user may thus be able to utilise the app and/or its dashboard to better tailor the acoustic feedback to their particular needs.

Consistory Set of Clauses

1. A method of transmitting a feedback signal from an aerosol provision system to a hearing aid, the method comprising outputting acoustic feedback by a hearing aid in response to receiving the feedback signal transmitted by the aerosol provision system, and controlling the hearing aid using the feedback signal.

2. A method of communicating with a hearing aid, wherein the method comprises: receiving a signal transmitted by an aerosol provision system for generating an aerosol, wherein the signal is configured for controlling the hearing aid.

3. The method according to any preceding clause, wherein the method further comprises:
 wirelessly transmitting the signal from the aerosol provision system to the hearing aid.

3. The method according to any preceding clause, wherein the method further comprises:
 transmitting the signal from the aerosol provision system directly to the hearing aid.

4. The method according to any preceding clause, wherein the hearing aid is a hearing aid of a user of the aerosol provision system.

5. The method according to any preceding clause, wherein the signal is configured to be transmitted by the aerosol provision system in response to a predetermined event being satisfied.

6. A method according to any preceding clause, wherein the signal is configured to be transmitted by the aerosol provision system in response to a predetermined event being determined as being satisfied by the aerosol provision system.

7. A method according to any preceding clause, wherein the feedback signal is transmitted by Bluetooth.

8. A method according to any preceding clause, wherein the acoustic feedback is configured to be indicative of a predetermined status of the aerosol provision system.

9. A method according to clause 8, wherein the predetermined status of the aerosol provision system comprises a predetermined adverse status of the aerosol provision system.

10. A feedback provision system comprising:
 an aerosol provision system for generating an aerosol; and
 a hearing aid for outputting acoustic feedback to a user of the aerosol provision system;
 wherein the hearing aid is configured to output the acoustic feedback in response to receiving a signal which is initially wirelessly transmitted by the aerosol provision system, wherein the signal is configured for controlling the hearing aid.

11. A feedback provision system according to clause 10, wherein the aerosol provision system is configured to wirelessly transmit the signal directly to the hearing aid.

12. A feedback provision system according to clause 10 or 11, wherein the signal is a feedback signal.

13. A feedback provision system according to any of clauses 10-12, wherein the hearing aid device is configured to receive the signal directly from the aerosol provision system.

14. A feedback provision system according to any of clauses 10-13, wherein the signal is configured to be transmitted by the aerosol provision system in response to a predetermined event being satisfied.

15. A feedback provision system according to any of clauses 10-14, wherein the signal is configured to be transmitted by the aerosol provision system in response to a predetermined event being determined as being satisfied by the aerosol provision system.

16. A feedback provision system according to clause 14 or 15, wherein the predetermined event comprises the aerosol provision system changing from a first mode of operation to a second mode of operation.

17. A feedback provision system according to any of clauses 14-16, wherein the predetermined event comprises at least one of:

i) the aerosol provision system being switched on; and/or
ii) the aerosol provision system being switched off.

18. A feedback provision system according to any of clauses 10-17, wherein the aerosol provision system comprises an aerosol generator, for aerosolising aerosol-generating material, for generating the aerosol.

19. A feedback provision system according to clause 18, when further dependent on any of clauses 14-17, wherein the predetermined event comprises any combination of:

i) the aerosol generator being operated;
ii) the aerosol generator being switched on; and/or
iii) the aerosol generator being switched off.

20. A feedback provision system according to clause 18 or 19, when further dependent on any of clauses 14-17, wherein the predetermined event comprises the aerosol generator exceeding a predetermined temperature.

21. A feedback provision system according to any of clauses 10-20, wherein the signal is wirelessly transmitted by the aerosol provision system by Bluetooth.

22. A feedback provision system according to any of clauses 10-21, wherein the signal comprises an audio output signal which is configured to be output by the hearing aid as part of the acoustic feedback.

23. A feedback provision system according to any of clauses 10-22, wherein the aerosol provision system comprises:

an aerosol provision device; and
a consumable for releasably engaging with the aerosol provision device, wherein the consumable is configured for receiving aerosol-generating material for aerosolising into the aerosol.

24. An aerosol provision system for generating an aerosol, wherein the aerosol provision system is configured to wirelessly transmit a signal to a hearing aid;

wherein the signal is configured for controlling the hearing aid.

Second Set of Consistory Clauses

1. An aerosol provision system for generating an aerosol, wherein the aerosol provision system is configured to be connected with an audio output device for outputting acoustic feedback to a user of the aerosol provision system;

wherein the aerosol provision system is configured to output a notification for confirming when the aerosol provision system is connected with the audio output device.

2. An aerosol provision system according to clause 1, wherein the audio output device comprises a hearing aid.

3. An aerosol provision system according to clause 1, wherein the audio output device comprises at least one of a loudspeaker; a headphone; and/or or earphone.

4. An aerosol provision system according to any preceding clause, wherein the aerosol provision system further comprises a display:

wherein the aerosol provision system is configured to output the notification on the display.

5. An aerosol provision system according to any preceding clause, wherein the aerosol provision system further comprises:

an aerosol provision device; and
a consumable for releasably engaging with the aerosol provision device, wherein the consumable is configured for receiving aerosol-generating material for aerosolising into the aerosol.

6. An aerosol provision system according to clause 5, when further dependent on clause 4, wherein the display is located on the aerosol provision device.

7. An aerosol provision system according to any preceding clause, wherein the notification comprises the displaying of a predetermined symbol.

8. An aerosol provision system according to any preceding clause, wherein the notification comprises the illumination of at least one LED from the aerosol provision system.

9. An aerosol provision system according to any preceding clause, wherein the notification comprises the illumination of at least one LED from the aerosol provision system:

i) in a predetermined colour; and/or
ii) in a predetermined sequence of illuminations of the at least one LED.

10. An aerosol provision system according to any preceding clause, wherein the aerosol provision system is configured to output the notification for as long as the aerosol provision system is connected with the audio output device.

11. An aerosol provision system according to any preceding clause, wherein the aerosol provision system is configured to stop outputting the notification when the aerosol provision system is no longer connected with the audio output device.

12. An aerosol provision system according to any preceding clause, wherein the aerosol provision system is configured to change the notification when the aerosol provision system is no longer connected with the audio output device to a second notification.

13. An aerosol provision system according to any preceding clause, wherein the aerosol provision system is configured to immediately stop outputting the notification as soon as the aerosol provision system is no longer connected with the audio output device.

14. An aerosol provision system according to any preceding clause, wherein the aerosol provision system is configured to be directly connected with the audio output device.

15. An aerosol provision system according to any preceding clause, wherein the aerosol provision system is configured to be connected with the audio output device via an intermediary device.

16. An aerosol provision system according to clause 15, wherein the intermediary device comprises a mobile phone.

17. An aerosol provision system according to any preceding clause, wherein the aerosol provision system is configured to be wirelessly connected with the audio output device.

18. An aerosol provision system according to any preceding clause, wherein the aerosol provision system is configured to be connected with the audio output device via Bluetooth.

19. An aerosol provision device for use in an aerosol provision system comprising the aerosol provision device and a consumable for releasably engaging with the aerosol provision device;

wherein the aerosol provision device is configured to be connected with an audio output device for outputting acoustic feedback to a user of the aerosol provision device;
wherein the aerosol provision device is configured to output a notification for confirming when the aerosol provision device is connected with the audio output device.

20. A mobile phone configured to be connected with:

an aerosol provision system for generating an aerosol; and
an audio output device, configured to be connected with the aerosol provision system, and configured for outputting acoustic feedback to a user of the aerosol provision system;

wherein the mobile phone is configured to output a notification for confirming when the aerosol provision system is connected with the audio output device.

21. A mobile phone according to clause 20, wherein the mobile phone is configured to be wirelessly connected with the audio output device and the aerosol provision system.

22. A mobile phone configured to be connected with:

an aerosol provision device for use in an aerosol provision system comprising the aerosol provision device and a consumable for releasably engaging with the aerosol provision device; and an audio output device, configured to be connected with the aerosol provision device, and configured for outputting acoustic feedback to a user of the aerosol provision device;

wherein the mobile phone is configured to output a notification for confirming when the aerosol provision device is connected with the audio output device.

23. A mobile phone according to clause 22, wherein the mobile phone is configured to be wirelessly connected with the audio output device and the aerosol provision device.

24. A mobile phone according to any of clauses 20-23, wherein the mobile phone further comprises a display;

wherein the mobile phone is configured to output the notification on the display.

25. A mobile phone according to any of clauses 20-24, wherein the notification comprises the displaying of a predetermined symbol.

26. A mobile phone according to any of clauses 20-25, wherein the mobile phone is configured to output the notification for as long as the aerosol provision system, or the aerosol provision device, is connected with the audio output device.

27. A mobile phone according to any of clauses 20-26, wherein mobile phone is configured to stop outputting the notification when the aerosol provision system, or the aerosol provision device, is no longer connected with the audio output device.

28. A mobile phone according to any of clauses 20-27, wherein the mobile phone is configured to change the notification when the aerosol provision system, or the aerosol provision device, is no longer connected with the audio output device to a second notification.

29. A mobile phone according to any of clauses 20-28, wherein the mobile phone is configured to immediately stop outputting the notification as soon as the aerosol provision system, or the aerosol provision device, is no longer connected with the audio output device.

30. A mobile phone according to any of clauses 20-29, wherein the audio output device comprises a hearing aid.

31. A mobile phone according to any of clauses 20-30, wherein the mobile phone is configured to output the notification as part of an app from the mobile phone.

32. A mobile phone according to clause 31, wherein the mobile phone is configured to output the notification as part of a dashboard from the app from the mobile phone, wherein the dashboard is configured to further allow at least one setting or operation of the aerosol provision system, or of the aerosol provision device, to be changed.

33. A mobile phone according to any of clauses 20-32, wherein the mobile phone is further configured to allow a user to vary a predetermined parameter of the acoustic feedback.

34. A mobile phone according to clause 33, when further dependent on clause 32, wherein the mobile phone is further configured to allow the user to vary the predetermined parameter of the acoustic feedback using the dashboard from the app.

35. A mobile phone according to clause 33 or 34, wherein the predetermined parameter comprises a volume of the acoustic feedback.

36. A mobile phone according to any of clauses 33-35, wherein the predetermined parameter comprises a duration of the acoustic feedback.

37. A mobile phone according to any of clauses 20-36, wherein the acoustic feedback is configured to be indicative of a predetermined status of the aerosol provision system, or of the aerosol provision device.

The invention claimed is:

1. A feedback provision system comprising:

an aerosol provision system for generating an aerosol; and an audio output device for outputting acoustic feedback to a user of the aerosol provision system;

wherein the audio output device is configured to output the acoustic feedback in response to receiving a feedback signal which is transmitted by the aerosol provision system, the feedback signal is configured for controlling the audio output device, the audio output device is remotely located from the aerosol provision system, the feedback signal is configured to be transmitted by the aerosol provision system in response to a predetermined event being satisfied and the predetermined event comprises the aerosol provision system changing from a first mode of operation to a second mode of operation.

2. A feedback provision system according to claim 1, wherein the feedback signal comprises an audio output signal which is configured to be output by the audio output device as part of the acoustic feedback.

3. A feedback provision system according to claim 1, wherein the feedback signal is configured to be transmitted by the aerosol provision system in response to a predetermined event being determined as being satisfied by the aerosol provision system.

4. A feedback provision system according to claim 3, wherein the predetermined event comprises at least one of:

i) the aerosol provision system being switched on; and/or ii) the aerosol provision system being switched off.

5. A feedback provision system according to claim 1, wherein the acoustic feedback is configured to be indicative of a predetermined status of the aerosol provision system.

6. An aerosol provision system for generating an aerosol, wherein the aerosol provision system is configured to be connected with an audio output device for outputting acoustic feedback to a user of the aerosol provision system;

wherein the aerosol provision system is configured to output a notification for confirming when the aerosol provision system is connected with the audio output device, wherein the aerosol provision system is configured to output the notification for as long as the aerosol provision system is connected with the audio output device.

7. An aerosol provision system according to claim 6, wherein the audio output device comprises at least one of a loudspeaker; a headphone; and/or or earphone.

8. An aerosol provision system according to claim 6, wherein the aerosol provision system further comprises a display:

wherein the aerosol provision system is configured to output the notification on the display, wherein the notification comprises the displaying of a predetermined symbol.

9. An aerosol provision system according to claim 6, wherein the notification comprises the illumination of at least one LED from the aerosol provision system.

10. An aerosol provision system according to claim 6, wherein the aerosol provision system is configured to change the notification when the aerosol provision system is no longer connected with the audio output device to a second notification.

11. An aerosol provision system according to claim 6, wherein the aerosol provision system is configured to be directly connected with the audio output device and wirelessly connected with the audio output device.

12. An aerosol provision system according to claim 6, wherein the aerosol provision system is configured to be connected with the audio output device via an intermediary device.

13. A mobile phone configured to be connected with: an aerosol provision system for generating an aerosol; and an audio output device, configured to be connected with the aerosol provision system, and configured for outputting acoustic feedback to a user of the aerosol provision system;

wherein the mobile phone is configured to output a notification for confirming when the aerosol provision system is connected with the audio output device, wherein the mobile phone is configured to be wirelessly connected with the audio output device and the aerosol provision system.

14. A mobile phone according to claim 13, wherein the mobile phone is configured to output the notification as part of an app from the mobile phone.

15. A mobile phone according to claim 14, wherein the mobile phone is configured to output the notification as part of a dashboard from the app from the mobile phone, wherein the dashboard is configured to further allow at least one setting or operation of the aerosol provision system, or of the aerosol provision device, to be changed.

16. A mobile phone according to claim 13, wherein the mobile phone is further configured to allow a user to vary a predetermined parameter of the acoustic feedback and the predetermined parameter comprises a volume of the acoustic feedback.

17. A mobile phone according to claim 13, wherein the mobile phone is further configured to allow a user to vary a predetermined parameter of the acoustic feedback and the predetermined parameter comprises a duration of the acoustic feedback.

18. A mobile phone according to claim 13, wherein the acoustic feedback is configured to be indicative of a predetermined status of the aerosol provision system, or of the aerosol provision device.

* * * * *